DIVERSITY COMBINING SYSTEM
Filed Dec. 16, 1958
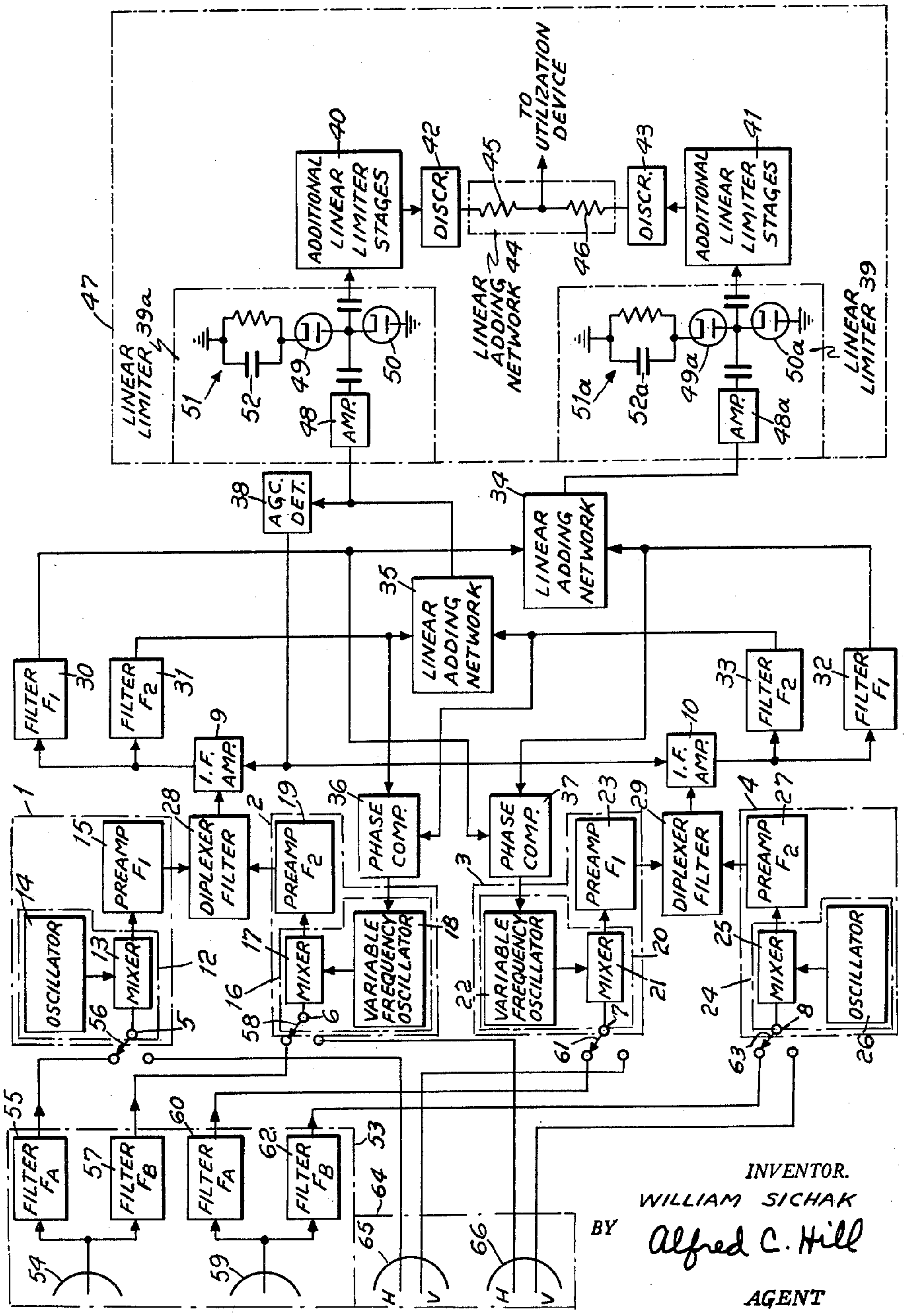
INVENTOR.
WILLIAM SICHAK
BY Alfred C. Hill
AGENT United States Patent Office
3,029,338
Patented Apr. 10, 1962

3,029,338
DIVERSITY COMBINING SYSTEM

William Sichak, Nutley, N.J., assignor to International Telephone and Telegraph Corporation, Nutley, N.J., a corporation of Maryland Filed Dec. 16, 1958, Ser. No. 780,812
15 Claims. (Cl. 250—20)

This invention relates to diversity receiving systems and more particularly to a quadruple diversity combining system for use in diversity communication systems employing any type of modulation. The description herein below, however, will be directed to angular modulations, such as frequency (FM) or phase (PM) modulation.

In communication systems which experience signal fading, such as, but not necessarily restricted thereto, beyond-the-horizon communication systems, diversity reception can be employed to reduce the effects of signal fading. Diversity reception requires that at least two signal paths be provided so that the signals following these paths are uncorrelated as to fading. The uncorrelated signals can be provided by employing spaced antennas, spaced carrier frequencies or receiving signals at spaced times. Independent of the means by which the separate uncorrelated signals are obtained, there is required a receiving arrangement to capitalize on the resultant diversity advantage. In a general sense the arrangement to capitalize on the diversity advantage may be divided into two categories, (1) switching diversity or (2) combining diversity. In switching diversity the quality of the signals from each receiving system are compared and the best signal is selected while the other signals are rejected. In combining diversity the signals received in a diversity system are combined by addition in controlled proportions to provide a better signal-to-noise ratio than that of any single receiver. This signal-to-noise improvement is possible because the noise voltage components are random in character and add in root mean square fashion while the signals add linearly. The combining diversity arrangement has a further advantage that no switching transients will occur such as will occur in switching diversity arrangements.

In the present state of the diversity communication art, it has been recognized that a two-fold combining arrangement provides an appreciable improvement in signal-to-noise ratio above an acceptable level over that achieved by a communication system not employing diversity. It has further been found that another increase in the percentage of time that the signal-to-noise ratio is above an acceptable level can be accomplished by resorting to a four-fold or quadruple diversity receiving system. It is further known that as the "fold" of a diversity receiving system is increased the percentage of time that the signal-to-noise ratio is above an acceptable level is increased. Economics plays an important factor in how many "folds" will be employed in a diversity communication system. It has been found that a quadruple diversity combining arrangement provides the reliability desired in certain high quality communication systems that is consistent with the cost of such a system, said reliability being the percentage of time that the signal-to-noise ratio is above an acceptable level. To achieve a two-fold system, it is required that there be two diversity or uncorrelated signals; for a four-fold or quadruple diversity system, it is required that there be four uncorrelated or diversity signals. Heretofore in predetection quadruple combining systems an intermediate frequency amplifier has been employed for each uncorrelated signal and in postdetection quadruple combining systems a demodulator has been employed in conjunction with each uncorrelated signal.

In the past it was believed necessary that diversity receivers had to receive and operate on signals which were completely uncorrelated to obtain diversity advantages. However, it has been discovered that a diversity advantage can be obtained even if the diversity signals are up to 60 percent correlated. Hence, it is to be understood that in the description of this invention the diversity signals may be completely uncorrelated as mentioned above or may be up to 60 percent correlated.

An object of this invention is to provide a quadruple diversity combining system having certain economical advantages over the quadruple diversity systems of the prior art.

Another object of this invention is the provision of a diversity combining system which employs a minimum amount of equipment necessary to achieve four-fold quadruple diversity reception.

Another object of this invention is the provision of a quadruple diversity combining system wherein each component in the system is protected by a similar component so that if one component fails the system still provides two-fold diversity communication. This results in a completely fail-safe system.

A further object of this invention is the provision of a quadruple diversity combining system employing equal gain combining of four diversity signals to reduce said four diversity signals to two diversity signals which are then operated upon to provide equal gain combining after demodulation of the modulation on the diversity signals.

Still a further object of this invention is the provision of a quadruple diversity combining system employing equal gain combining techniques both of the predetection type and the post-detection type.

A feature of this invention is to provide a signal combiner operable on a first pair of angularly modulated signals having a first center frequency and a second pair of angularly modulated signals having a second center frequency such that the signals of said first frequency are linearly added together prior to detection and the signals of said second frequency are linearly added together prior to detection thereof. The combined signals of said first frequency and the combined signals of said second frequency are then coupled to a third combining arrangement which linearly adds the detected intelligence of the combined signals of said first and second frequencies to provide a single signal for utilization in a utility device.

Another feature of this invention is the incorporation of a first amplifier to amplify one of the signals of said first center frequency and one of the signals of said second center frequency and a second amplifier to amplify another of the signals of said first center frequency and another of the signals of said second center frequency, the outputs of said first and second amplifiers being then operated upon to provide the desired equal gain combining of the signals of said first and second frequency signal, respectively, prior to detection of the modulation of the signals and the combining of the intelligence of the resultant combined first and second frequency signals after detection of the modulation of the combined signals.

Still another feature of this invention is the provision of filters at the output of each of the amplifiers to separate the first and second signals into appropriate paths so that the first and second signals may be operated upon for inphase combining to produce two resultant combined signals which then may be operated upon by a linear limiter type post-detection combining arrangement to combine the intelligence carried on the resultant combined signals. A further feature of this invention is the provision of only two demodulators for a quadruple diversity combining arrangement.

The above-mentioned and other features and objects of this invention will become more apparent by reference to the following description taken in conjunction with the accompanying drawing, the sole FIGURE of the drawing illustrating in block diagram form a quadrauple diversity combining system following the principles of this invention.

Referring to the figure of the drawing, there is illustrated therein a quadruple diversity combining system employing a first signal path 1, a second signal path 2, a third signal path 3, and a fourth signal path 4. To the input of each of said paths 1 to 4 is applied an angularly modulated diversity signal such as at terminals 5, 6, 7 and 8, respectively. It is to be remembered that the diversity signals have each followed a separate and distinct path from the transmitter to the receiver and that each of these signals applied to the input of the signal paths 1 to 4 are uncorrelated as to fading with respect to each other. In accordance with the teachings of this application, the signal paths are paired, the output signals therefrom being applied to a common IF (intermediate frequency) amplifier 9 and 10. Hence, the pair of paths 1 and 2 have their outputs applied to IF amplifier 9 and the pair of paths 3 and 4 have their outputs applied to IF amplifier 10. It will be further noted that signal path 1 provides at the output thereof a signal at a frequency $F_1$, while path 2 provides at the output thereof a signal at a frequency $F_2$. Path 3 likewise provides at the output thereof a signal at the frequency $F_1$, while path 4 provides at the output thereof a signal at the frequency $F_2$. It should be remembered that the signals at each of these frequencies are angularly modulated in accordance with the intelligence imparted thereto at a distant transmitter. For instance, if the modulation bandwidths is ½ mc., the two center frequencies $F_1$ and $F_2$ might be 68 and 72 mc., respectively.

Each of the paths 1 to 4 includes therein at least a heterodyning arrangement to reduce the radio frequency carrier carrying the angular modulation to an intermediate frequency having a value such as that set forth hereinabove to provide at the output of the first path of a pair of paths an angularly modulated signal at frequency $F_1$ and at the output of the second path of the pair of paths an angularly modulated signal at frequency $F_2$. As illustrated in the drawing, path 1 includes a heterodyning arrangement 12 including a mixer 13 and an oscillator 14 cooperating to produce the intermediate frequency signal $F_1$ which may be applied to a preamplifier 15 if so desired. The path 2 includes a heterodyning arrangement 16 including a mixer 17 and a variable frequency oscillator 18 to cooperate in producing an intermediate frequency signal $F_2$ which may be applied to preamplifier 19. The outputs of preamplifiers 15 and 19, if they are employed, or the outputs of mixers 13 and 17, if the preamplifiers are not employed, are coupled to IF amplifier 9. Signal path 3 includes a heterodyning arrangement 20 including therein a mixer 21 and a variable frequency oscillator 22 which cooperates in conjunction with a radio frequency carrier to produce an intermediate frequency signal having a value $F_1$ which may be applied if required to a preamplifier 23. Signal path 4 includes a heterodyning arrangement 24 which incorporates a mixer 25 and a fixed frequency oscillator 26 to cooperate with the radio frequency carrier applied to the input of mixer 25 to produce at the output thereof an intermediate frequency signal having a value $F_2$ which may be applied to preamplifier 27. The outputs of mixers 21 and 25, or if the preamplifiers 23 and 27 are employed, the outputs therefrom are applied to IF amplifier 10. As illustrated, the outputs from preamplifiers 15 and 19 are coupled to a diplexer filter 28 which in turn couples the signals $F_1$ and $F_2$ to IF amplifier 9, while the outputs of amplifiers 23 and 27 are coupled to a diplexer filter 29 which in turn couples the signals $F_1$ and $F_2$ to IF amplifier 10. The purpose of the diplexing filter is to provide a system wherein the two intermediate frequencies $F_1$ and $F_2$ may be amplified in the same amplifier without degradation of the noise figure.

Having now gotten the received angularly modulated signal to an intermediate frequency level at the output of IF amplifiers 9 and 10, the quadruple diversity combining system of this invention employs a first filter 30 coupled to the output of amplifier 9 to pass the signal $F_1$ and a filter 31 coupled to the output of amplifier 9 to pass the signal $F_2$. Likewise, to the output of amplifier 10 there is employed a filter 32 to pass the signal having a frequency $F_1$ and a filter 33 passing a signal of frequency $F_2$. The signal output of filters 30 and 32, a signal at frequency $F_1$, is applied to the linear adding network 34, while the output of filters 31 and 33, a signal at frequency $F_2$, is applied to the linear adding network 35. These linear adding networks 34 may constitute a hybrid or merely a resistive adding network. However, to assure that the signals applied to networks 34 and 35 are added substantially in phase, it is necessary to employ phase comparators 36 and 37. Phase comparator 36 is responsive to the signals at the output of filters 31 and 33 to produce a control voltage which is proportional to the phase difference between the two signals having the frequency $F_2$. The control signal at the output of phase comparator 36 is coupled to variable frequency oscillator 18 to adjust the frequency thereof in accordance with the control signal and thereby adjust the relative phase relationship between the signals having a frequency $F_2$ to enable the desired inphase combining of these signals in network 35. Phase comparator 37 is responsive to the output signals of filters 30 and 32 to produce a control voltage which is proportional to the phase difference between the signals having the frequency $F_1$. The control signal from phase comparator 37 is coupled to the variable frequency oscillator 22 to thereby adjust the frequency of oscillator 22 which in turn will adjust the relative phase relationship of the signals at frequency $F_1$ to enable the desired inphase combining these signals in network 34.

It should be pointed out that variable frequency oscillators 18 and 22 may for example take the form of an oscillator employing a reactance tube modulator with the reactance tube modulator adjusting the frequency of the oscillator in accordance with the control signals applied thereto. Other known types of variable frequency oscillators may of course be employed which will accomplish the desired end result.

One other requirement in the combining system of this receiving system is to assure equal gain for the signals applied to the linear adding network to thereby provide the desired predetection equal gain combining arrangement, the circuit illustrated herein being one form thereof. The equal gain for IF amplifiers 9 and 10 is provided by an AGC detector 38 coupled to the output of one of the linear adding networks 34 or 35. In the figure of the drawing of this application, it is illustrated that the detector 38 is coupled to the output of network 35 to produce a control voltage which is proportional to the amplitude of the combined signal at the frequency $F_2$. This control voltage is coupled to amplifiers 9 and 10 to thereby adjust the gain thereof so that there is equal gain in each of these amplifiers. Detector 38 could just as well have been connected to the output of network 34 to develop a control voltage proportional to the amplitude of the combined signals $F_1$.

The resultant combined signals at the output of networks 34 and 35, the combined predetection signal outputs, are coupled to a post-detection combining arrangement shown specifically to include linear limiter 39*a* coupled to the output of network 35 and linear limiter 39 coupled to the output of network 34. If desired, additional linear limiters may be employed in each of the output paths from networks 34 and 35 as indicated by blocks 40 and 41. The output of the linear limiters is applied to discriminators 42 and 43 to respectively demodulate the signal having the center frequency $F_2$ and the signal having the center frequency $F_1$. The intelligence signal at the output of discriminators 42 and 43 is applied to linear adding network 44, which may take the form of a hybrid or, as illustrated, resistors 45 and 46. Hence, in the post-detection combining arrangement illustrated generally by dotted box 47, the intelligence signals are combined after recovery from the intermediate frequency signals. The action of the linear limiters is such as to provide equal gain from the input of the post-detection combining arrangement 47 to a point following the discriminators 42 and 43. The linear limiters are limiters which exhibit a characteristic wherein the output signal level varies in accordance with the input signal level. Thus, the relative amplitudes of the signals applied to the input thereof are preserved or the ratio increased at the discriminator outputs to thereby enable the linear addition of the detected outputs to achieve diversity advantage. The linear limiter is a type of limiter which may be termed an A.C. limiter acting to suppress or greatly reduce rapid variations in signal amplitude but which does not exhibit a permanent change in gain when the long-term average signal level increases or decreases.

There are many types of limiter circuits which behave as set forth above and thereby provide the desired action. The schematic illustration in the block identified as linear limiters 39*a* and 39 indicates one form of limiter which will enable the achievement of the desired maintenance of signal ratio at the input of combining circuit 47 at the output of discriminators 42 and 43. Linear limiters 39*a* and 39 are illustrated to include an amplifier 48, the output of which is coupled to a pair of series connected diodes 49 and 50 with the anode of diode 50 being connected to ground and the cathode of diode 49 being connected to a time constant circuit 51. The action of this linear limiter is as follows. When diodes 49 and 50 conduct, a charge is stored on condenser 52 of the time constant circuit 51 to establish a diode bias or limiting level. The time constant of the time constant circuit 51 does not permit this limiting level to fluctuate rapidly, but the capacitor charge and hence the limiting level will adjust ultimately to long-term signal level changes. For instantaneous amplitude fluctuations of the signal applied from combining networks 34 and 35, the diodes 49 and 50 will act to limit the amplitude level of the output of amplifier 48 to the bias level established at condenser 52, since diodes 49 and 50 will not conduct for signals that exceed this limiting level. However, if the signal amplitude coupled to diodes 49 and 50 should change in a long-term manner, that is, a steady increase or a steady decrease for a sufficient period of time, the charge on condenser 52 will change to adjust the limiting or bias level to this new long-term signal level change, and hence there is no permanent change in the gain of the linear limiter. This arrangement thereby provides a limiter whose output signal level varies with the input signal strength and thereby maintains equal gain from the outputs of networks 34 and 35 to a point following discriminators 42 and 43. With this type of limiter, namely the linear limiter or A.C. limiter, the noise present in the system is maintained substantially constant or may even decrease slightly. Hence, if the signal level decreases, the noise of this post-detection combining arrangement does not increase. It is for this reason that this type of post-detection combining arrangement is preferred for utilization in a quadruple diversity system of this invention, since in other types of heretofore known post-detection diversity combining systems, the noise in the angular modulation receivers tends to increase as the signal decreases. A more detailed discussion of linear limiters and post-detection combining arrangements employing such limiters including other arrangements to achieve linear limiting may be found by referring to the copending application of R. T. Adams-B. M. Mindes-Z. G. Lyon, "Post-Detection Diversity Combining System," Serial No. 767,547, filed October 16, 1958, assigned to the same assignee as the present application.

By employing the system of this invention, it is immediately obvious that only two IF amplifiers are required rather than the heretofore employed four IF amplifiers and also that only two discriminators or demodulators are required rather than the heretofore employed four discriminators or demodulators. It will also be observed that each of the components is protected against failure with a failure of one component resulting in only a loss of one degree of diversity. Hence, the quadruple diversity arrangement would go to a two-fold diversity arrangement if one component were lost. The system illustrated and described herein is an optimum system in that the least amount of equipment is employed to achieve quadruple diversity combining with the desirable fail-safe feature of maintaining communication if a component fails, said communication being carried on over a two-fold diversity rather than a four-fold diversity system.

As we pointed out hereinabove, the signal paths 1 to 4 have applied thereto diversity or uncorrelated signals at terminals 5 to 8, respectively. In the figure of the drawing, there is illustrated two alternatives by which the four uncorrelated diversity signals may be derived. Referring first to the configuration generally identified by reference character 53 there is provided a first antenna 54 to receive two signals, one at a radio frequency carrier signal $F_A$ and a second radio frequency signal $F_B$. A filter 55 is provided to couple the signal $F_A$ to terminal 5 by means of switch 56. Filter 57 is coupled to antenna 54 to pass signal $F_B$ to terminal 6 by means of switch 58. There is further provided a second antenna 59 in a spaced relation with respect to antenna 54 which also receives the carrier frequencies $F_A$ and $F_B$. Filter 60 coupled to antenna 59 passes signal $F_A$ to terminal 7 via switch 61, while filter 62 coupled to antenna 59 couples signal $F_B$ to terminal 8 via switch 63. In this arrangement 53 there are then provided two signals at spaced frequencies with the space there between being sufficient to provide uncorrelated signals. This is a frequency diversity arrangement. Signals $F_A$ and $F_B$ are also received on two spaced antennas where the antenna spacing is sufficient to provide paths of sufficient length so that uncorrelated signals $F_A$ and $F_B$ received on antenna 54 are uncorrelated with the uncorrelated signals $F_A$ and $F_B$ received on antenna 59.

A second arrangement to provide the uncorrelated signals at terminals 5 to 8 is provided by the arrangement indicated generally by reference character 64. In this arrangement antennas 65 and 66 are physically spaced with respect to each other to received uncorrelated signals having carrier frequencies which have the same nominal frequency. Each of the antennas 65 and 66 are arranged to receive horizontally and vertically polarized signals which due to their different polarizations are uncorrelated.

Thus, with switches 56, 58, 61 and 63 moved to the terminal connected to the arrangement 64 the four uncorrelated signals may be applied to terminals 5 to 8. The signal coupled to terminal 5 is the horizontally polarized signal from antenna 65. The signal coupled to terminal 6 is the horizontally polarized signal from antenna 66. The signals coupled to terminals 7 and 8 are the vertically polarized signals of antennas 65 and 66, respectively.

Regardless of how the uncorrelated signals are derived and regardless of the frequencies thereof (the same or spaced frequencies), it is necessary to arrange the frequency of oscillators 14, 18, 22 and 26 to provide the desired intermediate frequency signals $F_1$ and $F_2$ at the output of mixers 13, 17, 21 and 25.

While I have described above the principles of my invention in connection with specific apparatus, it is to be clearly understood that this description is made only by way of example and not as a limitation to the scope of my invention as set forth in the objects thereof and in the accompanying claims.

I claim:

1. A quadruple diversity signal combiner comprising a first pair of sources of modulated diversity signals having a first center frequency, a second pair of sources of modulated diversity signals having a second center frequency, a first amplifier common to one of the sources of said first and second pairs of sources, a second amplifier common to the other source of said first and second pairs of sources, a first predetection combining means coupled to said first and second amplifiers to linearly add the signals of said first center frequency, a second predetection combining means coupled to said first and second amplifiers to linearly add the signals of said second center frequency, and a post-detection combining means including a detector coupled to said first predetection combining means and said second predetection combining means to linearly add the intelligence of the signals at the outputs of said first and second predetection combining means.

2. A quadruple diversity signal combiner comprising a first pair of sources of modulated diversity signals having a first center frequency, a second pair of sources of modulated diversity signals having a second center frequency, a first amplifier common to one of the sources of said first and second pairs of sources, a second amplifier common to the other source of said first and second pairs of sources, a first filter to pass the signals of said first center frequency coupled to the output of said first amplifier, a second filter to pass the signals of said second center frequency coupled to the output of said first amplifier, a third filter to pass the signals of said first center frequency coupled to the output of said second amplifier, a fourth filter to pass the signals of said second center frequency coupled to the output of said second amplifier, a first predetection combining means coupled to said first and third filters to linearly add the signals of said first center frequency, a second predetection combining means coupled to said second and fourth filters to linearly add the signals of said second center frequency, and a post-detection combining means including a detector coupled to said first predetection combining means and said second predetection combining means to linearly add the intelligence of the signals at the outputs of said first and second predetection combining means.

3. A quadruple diversity signal combiner comprising four sources of modulated diversity signals, two pairs of signal paths, means to couple each of said sources to one of said paths, means disposed in the first path of each of said pairs of paths to provide a signal output therefrom at a first frequency, means disposed in the second path of each of said pairs of paths to provide a signal output therefrom at a second frequency, a first amplifier coupled in common to the first and second paths of one of said pairs of paths, a second amplifier coupled in common to the first and second paths of the other of said pairs of paths, a first predetection combining means coupled to the output of said first and second amplifiers to linearly add the signals of said first frequency, a second predetection combining means coupled to the output of said first and second amplifiers to linearly add the signals of said second frequency, and means coupled to said first predetection combining means and said second predetection combining means to linearly add the intelligence of the signals at the outputs of said first and second predetection combining means.

4. A quadruple diversity signal combiner comprising four sources of modulated diversity signals, two pairs of signal paths, means to couple each of said sources to one of said paths, means disposed in the first path of each of said pairs of paths to provide a signal output therefrom at a first frequency, means disposed in the second path of each of said pairs of paths to provide a signal output therefrom at a second frequency, a first amplifier coupled in common to the first and second paths of one of said pairs of paths, a second amplifier coupled in common to the first and second paths of the other of said pairs of paths, a first filter coupled to said first amplifier to pass the signals of said first frequency, a second filter coupled to said first amplifier to pass the signals of said second frequency, a third filter coupled to said second amplifier to pass the signals of said first frequency, a fourth filter coupled to said second amplifier to pass the signals of said second frequency, a first predetection combining means coupled to the output of said first and third filters to linearly add the signals of said first frequency, a second predetection combining means coupled to the output of said second and fourth filters to linearly add the signals of said second frequency, and means coupled to said first predetection combining means and said second predetection combining means to linearly add the intelligence of the signals at the outputs of said first and second predetection combining means.

5. A quadruple diversity signal combiner comprising four sources of modulated diversity signals, two pairs of signal paths, means to couple each of said sources to one of said paths, a heterodyning arrangement in each of said paths to provide a signal at a first frequency in the first path of each of said pairs of paths and a signal at a second frequency in the second path of each of said pairs of paths, means coupled to the output of each of said first paths to combine the signals of said first frequency substantially in phase, means coupled to the output of each of said second paths to combine the signals of said second frequency substantially in phase, means coupled to said first paths to produce a first control signal proportional to the phase difference between the signals of said first frequency, means to couple said first control signal to the heterodyning arrangement of at least one of said first paths to adjust the relative phase of the signals of said first frequency for inphase combining, means coupled to said second paths to produce a second control signal proportional to the phase difference between the signals of said second frequency, means to couple said second control signal to the heterodyning arrangement of at least one of said second paths to adjust the relative phase of the signals of said second frequency for inphase combining, and means coupled to the output of each of said combining means to linearly add the intelligence of the signals at the outputs of said combining means.

6. A quadruple diversity signal combiner comprising four sources of modulated diversity signals, two pairs of signal paths, means to couple each of said sources to one of said paths, a heterodyning arrangement in each of said paths to provide a signal at a first frequency in the first path of each of said pairs of paths and a signal at a second frequency in the second path of each of said pairs of paths, a first amplifier coupled to the first and second paths of one of said pairs of paths, a second amplifier coupled in common to the first and second paths of the other of said pairs of paths, means coupled to the output of said first and second amplifiers to combine the signals of said first frequency substantially in phase, means coupled to the output of said first and second amplifiers to combine the signals of said second frequency substantially in phase, means coupled to the output of said first and second amplifiers responsive to the signals of said first frequency to produce a first control signal proportional to the phase difference between the signals of said first frequency, means to couple said first control signal to the heterodyning arrangement of at least one of said first paths to adjust the relative phase of the signals of said first frequency for inphase combining, means coupled to the output of said first and second amplifiers responsive to the signals of said second frequency to produce a second control signal proportional to the phase difference between the signals of said second frequency, means to couple said second control signal to the heterodyning arrangement of at least one of said second paths to adjust the relative phase of the signals of said second frequency for inphase combining and means coupled to the output of each of said combining means to linearly add the intelligence of the signals at the outputs of said combining means.

7. A quadruple diversity signal combiner comprising four sources of modulated diversity signals, two pairs of signal paths, means to couple each of said sources to one of said paths, a heterodyning arrangement in each of said paths to provide a signal at a first frequency in the first path of each of said pairs of paths and a signal at a second frequency in the second path of each of said pairs of paths, a first amplifier coupled to the first and second paths of one of said pairs of paths, a second amplifier coupled in common to the first and second paths of the other of said pairs of paths, a first filter coupled to the output of said first amplifier to pass the signals of said first frequency, a second filter coupled to the output of said first amplifier to pass the signals of said second frequency, a third filter coupled to the output of said second amplifier to pass the signals of said first frequency, a fourth filter coupled to the output of said second amplifier to pass the signals of said second frequency, means coupled to the output of said first and third filters to combine the signals of said first frequency substantially in phase, means coupled to the output of said second and fourth filters to combine the signals of said second frequency substantially in phase, means coupled to the output of said first and third filters responsive to the signals of said first frequency to produce a first control signal proportional to the phase difference between the signals of said first frequency, means to couple said first control signal to the heterodyning arrangement of at least one of said first paths to adjust the relative phase of the signals of said first frequency for inphase combining, means coupled to the output of said second and fourth filters responsive to the signals of said second frequency to produce a second control signal proportional to the phase difference between the signals of said second frequency, means to couple said second control signal to the heterodyning arrangement of at least one of said second paths to adjust the relative phase of the signals of said second frequency for inphase combining, and means coupled to the output of each of said combining means to linearly add the intelligence of the signals at the outputs of said combining means.

8. A quadruple diversity signal combiner comprising four sources of modulated diversity signals, two pairs of signal paths, means to couple each of said sources to one of said paths, a heterodyning arrangement in each of said paths to provide a signal at a first frequency in the first path of each of said pairs of paths and a signal at a second frequency in the second path of each of said pairs of paths, a first amplifier coupled to the first and second paths of one of said pairs of paths, a second amplifier coupled in common to the first and second paths to the other of said pairs of paths, means coupled to the output of said first and second amplifiers to combine the signals of said first frequency substantially in phase, means coupled to the output of said first and second amplifiers to combine the signals of said second frequency substantially in phase, means coupled to the output of said first and second amplifiers responsive to the signals of said first frequency to produce a first control signal proportional to the phase difference between the signals of said first frequency, means to couple said first control signal to the heterodyning arrangement of at least one of said first paths to adjust the relative phase of the signals of said first frequency for inphase combining, means coupled to the output of said first and second amplifiers responsive to the signals of said second frequency to produce a second control signal proportional to the phase difference between the signals of said second frequency, means to couple said second control signal to the heterodyning arrangement of at least one of said second paths to adjust the relative phase of the signals of said second frequency for inphase combining, means coupled to the output of one of said combiner means responsive to the amplitude of the combined output signal to produce a third control signal proportional to the amplitude of the combined output signal, means to couple said third control signal to said first and second amplifiers to control the gain thereof to be equal and means coupled to the output of each of said combining means to linearly add the intelligence of the signals at the outputs of said combining means.

9. A quadruple diversity signal combiner comprising four sources of modulated diversity signals, two pairs of signal paths, means to couple each of said sources to one of said paths, a heterodyning arrangement in each of said paths to provide a signal at a first frequency in the first path of each of said pairs of paths and a signal at a second frequency in the second path of each of said pairs of paths, a first amplifier coupled to the first and second paths of one of said pairs of paths, a second amplifier coupled in common to the first and second paths of the other of said pairs of paths, a first filter coupled to said first amplifier to pass the signals of said first frequency, a second filter coupled to said first amplifier to pass the signals of said second frequency, a third filter coupled to said second amplifier to pass the signals of said first frequency and a fourth filter coupled to said second amplifier to pass the signals of said second frequency, means coupled to the output of said first and third filters to combine the signals of said first frequency substantially in phase, means coupled to the output of said second and fourth filters to combine the signals of said second frequency substantially in phase, means coupled to the output of said first and third filters responsive to the signals of said first frequency to produce a first control signal proportional to the phase difference between the signals of said first frequency, means to couple said first control signal to the heterodyning arrangement of at least one of said first paths to adjust the relative phase of the signals of said first frequency for inphase combining, means coupled to the output of said second and fourth filters responsive to the signals of said second frequency to produce a second control signal proportional to the phase difference between the signals of said second frequency, means to couple said second control signal to the heterodyning arrangement of at least one of said second paths to adjust the relative phase of the signals of said second frequency for inphase combining, means coupled to the output of one of said combining means responsive to the combined output signal therefrom to produce a third control signal proportional to the amplitude of the combined signal output, means to couple said third control signal to each of said first and second amplifiers to adjust the gain thereof to be equal, and means coupled to the output of each of said combining means to linearly add the intelligence of the signals at the outputs of said combining means.

10. A quadruple diversity signal combiner comprising a first pair of sources of modulated diversity signals having a first intermediate frequency, a second pair of sources of angularly modulated diversity signals having a second intermediate frequency, a first amplifier common to one of the sources of said first and second pairs of sources, a second amplifier common to the other source of said first and second pairs of sources, a first combining means coupled to said first and second amplifiers to linearly add the signals of said first intermediate frequency, a second combining means coupled to said first and second amplifiers to linearly add the signals of said second intermediate frequency, and a third combining means coupled to said first and second combining means to linearly add the intelligence of the signals at the outputs of said first and second combining means.

11. A signal combiner comprising a first pair of sources of modulated signals having a first frequency, a second pair of sources of modulated signals having a second frequency, the signals of said sources being less than 60 percent correlated with respect to each other, a first amplifier common to one of the sources of said first and second pairs of sources, a second amplifier common to the other source of said first and second pairs of sources, a first combining means coupled to said first and second amplifiers to linearly add the signals of said first frequency, a second combining means coupled to said first and second amplifiers to linearly add the signals of said second frequency, and a third combining means coupled to said first and second combining means to linearly add the intelligence of the signals at the outputs of said first and second combining means.

12. A signal combiner comprising four sources of modulated signals, the signals of said sources being less than 60 percent correlated with respect to each other, two pairs of signal paths, means to couple each of said sources to one of said paths, a heterodyning arrangement in each of said paths to provide a signal at a first frequency in the first path of each of said pairs of paths and a signal at a second frequency in the second path of each of said pairs of paths, a first amplifier coupled to the first and second paths of one of said pairs of paths, a second amplifier coupled in common to the first and second paths of the other of said pairs of paths, means coupled to the output of said first and second amplifiers to combine the signals of said first frequency substantially in phase, means coupled to the output of said first and second amplifiers to combine the signals of said second frequency substantially in phase, means coupled to the output of said first and second amplifiers responsive to the signals of said first frequency to produce a first control signal proportional to the phase difference between the signals of said first frequency, means to couple said first control signal to the heterodyning arrangement of at least one of said first paths to adjust the relative phase of the signals of said first frequency for inphase combining, means coupled to the output of said first and second amplifiers responsive to the signals of said second frequency to produce a second control signal proportional to the phase difference between the signals of said second frequency, means to couple said second control signal to the heterodyning arrangement of at least one of said second paths to adjust the relative phase of the signals of said second frequency for inphase combining, and means coupled to the output of each of said combining means to linearly add the intelligence of the signals at the outputs of said combining means.

13. A signal combiner comprising four sources of modulated signals, the signals of each of said sources being less than 60 percent correlated with respect to each other, two pairs of signal paths, means to couple each of said sources to one of said paths, a heterodyning arrangement in each of said paths to provide a signal at a first frequency in the first path of each of said pairs of paths and a signal at a second frequency in the second path of each of said pairs of paths, a first amplifier coupled to the first and second paths of one of said pairs of paths, a second amplifier coupled in common to the first and second paths of the other of said pairs of paths, a first filter coupled to the output of said first amplifier to pass the signals of said first frequency, a second filter coupled to the output of said first amplifier to pass the signals of said second frequency, a third filter coupled to the output of said second amplifier to pass the signals of said first frequency, a fourth filter coupled to the output of said second amplifier to pass the signals of said second frequency, means coupled to the output of said first and third filters to combine the signals of said first frequency substantially in phase, means coupled to the output of said second and fourth filters to combine the signals of said second frequency substantially in phase, means coupled to the output of said first and third filters responsive to the signals of said first frequency to produce a first control signal proportional to the phase difference between the signals of said first frequency, means to couple said first control signal to the heterodyning arrangement of at least one of said first paths to adjust the relative phase of the signals of said first frequency for inphase combining, means coupled to the output of said second and fourth filters responsive to the signals of said second frequency to produce a second control signal proportional to the phase difference between the signals of said second frequency, means to couple said second control signal to the heterodyning arrangement of at least one of said second paths to adjust the relative phase of the signals of said second frequency for inphase combining, and means coupled to the output of each of said combining means to linearly add the intelligence of the signals at the outputs of said combining means.

14. A quadruple diversity signal combiner comprising four sources of modulated diversity signals, two pairs of signal paths, means to couple each of said sources to one of said paths, a heterodyning arrangement in each of said paths to provide a signal at a first frequency in the first path of each of said pairs of paths and a signal at a second frequency in the second path of each of said pairs of paths, a first amplifier coupled to the first and second paths of one of said pairs of paths, a second amplifier coupled in common to the first and second paths of the other of said pairs of paths, a first filter coupled to the output of said first amplifier to pass the signals of said first frequency, a second filter coupled to the output of said first amplifier to pass the signals of said second frequency, a third filter coupled to the output of said second amplifier to pass the signals of said first frequency, a fourth filter coupled to the output of said second amplifier to pass the signals of said second frequency, means coupled to the output of said first and third filters to combine the signals of said first frequency substantially in phase, means coupled to the output of said second and fourth filters to combine the signals of said second frequency substantially in phase, means coupled to the output of said first and third filters responsive to the signals of said first frequency to produce a first control signal proportional to the phase difference between the signals of said first frequency, means to couple said first control signal to the heterodyning arrangement of at least one of said first paths to adjust the relative phase of the signals of said first frequency for inphase combining, means coupled to the output of said second and fourth filters responsive to the signals of said second frequency to produce a second control signal proportional to the phase difference between the signals of said second frequency, means to couple said second control signal to the heterodyning arrangement of at least one of said second paths to adjust the relative phase of the signals of said second frequency for inphase combining, means responsive to the combined signals of said first frequency to detect the intelligence thereof, means responsive to the signals of said second frequency to detect the intelligence thereof, means coupled between the output of each of said combining means and its corresponding one of said means to detect to preserve the relative amplitude of the combined signals at the output of said combining means at the output of said detector means, and means to linearly add the output signals of said detector means together.

15. A quadruple diversity signal combiner comprising four sources of modulated diversity signals, two pairs of signal paths, means to couple each of said sources to one of said paths, a heterodyning arrangement in each of said paths to provide a signal at a first frequency in the first path of each of said pairs of paths and a signal at a second frequency in the second path or each of said pairs of paths, a first amplifier coupled to the first and second paths of one of said pairs of paths, a second amplifier coupled in common to the first and second paths of the other of said pairs of paths, a first filter coupled to the output of said first amplifier to pass the signals of said first frequency, a second filter coupled to the output of said first amplifier to pass the signals of said second frequency, a third filter coupled to the output of said second amplifier to pass the signals of said first frequency, a fourth filter coupled to the output of said second amplifier to pass signals of said second frequency, means coupled to the output of said first and third filters to combine the signals of said first frequency substantially in phase, means coupled to the output of said second and fourth filters to combine the signals of said second frequency substantially in phase, means coupled to the output of said first and third filters responsive to the signals of said first frequency to produce a first control signal proportional to the phase difference between the signals of said first frequency, means to couple said first control signal to the heterodyning arrangement of at least one of said first paths to adjust the relative phase of the signals of said first frequency for inphase combining, means coupled to the output of said second and fourth filters responsive to the signals of said second frequency to produce a second control signal proportional to the phase difference between the signals of said second frequency, means to couple said second control signal to the heterodyning arrangement of at least one of said second paths to adjust the relative phase of the signals of said second frequency for inphase combining, means coupled to the output of one of said combining means responsive to the combined signal output therefrom to produce a third control signal proportional to the amplitude of the combined signal, means to couple said third control signal to each of said first and second amplifiers to control the gain thereof to be equal, means responsive to the combined signals of said first frequency to detect the intelligence thereof, means responsive to the signals of said second frequency to detect the intelligence thereof, means coupled between the output of each of said combining means and its corresponding one of said means to detect to preserve the relative amplitude of the combined signals at the output of said combining means at the output of said detector means, and means to linearly add the output signals of said detector means together.

References Cited in the file of this patent

UNITED STATES PATENTS

| | | |
|---|---|---|
| 1,747,221 | Bown | Feb. 18, 1930 |
| 2,070,418 | Beverage | Feb. 9, 1937 |
| 2,269,594 | Mathes | Jan. 13, 1942 |
| 2,375,126 | Mathes | May 1, 1945 |
| 2,413,543 | Carlson | Dec. 31, 1946 |
| 2,511,014 | Schultz | June 13, 1950 |
| 2,520,188 | Yando | Aug. 29, 1950 |
| 2,636,115 | Peterson et al. | Apr. 21, 1953 |
| 2,683,213 | Earp | July 6, 1954 |
| 2,691,726 | Leypold | Oct. 12, 1954 |
| 2,786,133 | Dyke | Mar. 19, 1957 |
| 2,899,548 | Boughtwood et al. | Aug. 11, 1959 |

OTHER REFERENCES

Altman and Sichak: "Simplified Diversity Communication System for Beyond-the-Horizon Links," Electrical Communication, June 1956, pages 151–154.

Altman: "Configuration for Beyond-the-Horizon Diversity Systems," Electrical Communication, June 1956, pages 161–164.